(12) United States Patent
Tembreull et al.

(10) Patent No.: US 11,092,281 B2
(45) Date of Patent: Aug. 17, 2021

(54) MOUNTING SYSTEM FOR SECURING AN ARTICLE TO A WALL

(71) Applicants: Michael D. Tembreull, Michigamme, MI (US); Vincent M. Tembreull, Cadillac, MI (US); Thomas M. Tembreull, Champion, MI (US)

(72) Inventors: Michael D. Tembreull, Michigamme, MI (US); Vincent M. Tembreull, Cadillac, MI (US); Thomas M. Tembreull, Champion, MI (US)

( * ) Notice: Subject to any disclaimer, the term of this patent is extended or adjusted under 35 U.S.C. 154(b) by 0 days.

(21) Appl. No.: 16/733,922

(22) Filed: Jan. 3, 2020

(65) Prior Publication Data

US 2021/0207765 A1 Jul. 8, 2021

(51) Int. Cl.
*F16M 13/00* (2006.01)
*F16M 13/02* (2006.01)

(52) U.S. Cl.
CPC .................. *F16M 13/02* (2013.01)

(58) Field of Classification Search
CPC .............................. F16M 13/02; F16M 13/00
See application file for complete search history.

(56) References Cited

U.S. PATENT DOCUMENTS

| 4,793,267 | A | 12/1988 | Birillo | |
|---|---|---|---|---|
| 5,056,868 | A * | 10/1991 | Beck | A47C 7/546 297/411.29 |
| 5,230,493 | A | 9/1993 | Luoto | |
| 5,788,200 | A | 8/1998 | Jones | |
| 6,364,263 | B1 | 4/2002 | Ryan | |
| 7,360,627 | B2 | 4/2008 | Scott | |
| 9,163,415 | B2 | 10/2015 | Nies | |
| 10,591,106 | B2 * | 3/2020 | Pell | F16M 11/16 |
| 2012/0018396 | A1 | 1/2012 | Susan, Jr. | |
| 2014/0138497 | A1 * | 5/2014 | Chung | F16M 11/08 248/73 |

* cited by examiner

*Primary Examiner* — Amy J. Sterling
(74) *Attorney, Agent, or Firm* — Burris Law, PLLC (57) ABSTRACT

A mounting system with a mount member that is configured to be recessed into the wall. The mount member defines a first mount, which is configured to be abutted against a structural member of the wall, a second mount, which is parallel to the first mount, and a pair of first legs that are coupled to at least one of the first and second mounts and which space the first and second mounts apart from one another. A plurality of mounting holes are formed through the first mount and a plurality of clearance holes are formed through the second mount. Each of the clearance holes is disposed in-line with an associated one of the mounting holes. A slot is formed through the second mount. The slot is disposed between the first legs and extends through a side of the second mount.

20 Claims, 9 Drawing Sheets

MOUNTING SYSTEM FOR SECURING AN ARTICLE TO A WALL

FIELD

The present disclosure relates to a mounting system for securing an article to a wall.

BACKGROUND

This section provides background information related to the present disclosure which is not necessarily prior art.

It can sometimes be desirable to mount a relatively large, heavy article to a structure in a way that hides or conceals the manner in which the article is mounted to the structure. Examples of such articles include fireplace mantels and the log stringers for a log staircase.

One method known in the art is to secure the article to the structure with threaded fasteners that are installed into counterbored holes in the front face of the article. Once the article has been installed (i.e., the threaded fasteners are tightened sufficiently to secure the article to the structure), plugs are driven into the counterbores in the front face of the article and the plugs are trimmed flush with the front face of the article. While this approach does hide the threaded fasteners, the plugs are nevertheless visible.

Another method known in the art is to use threaded fasteners that are driven from the back side of the structure through the back side of the article to secure the article to the structure. However, it is sometimes difficult to get access to the back side of the structure without causing unwanted damage to another area of the structure. Alternatively, this method may require that the article be mounted to the structure at a relatively early point in time, such as during framing of a wall. This may not be desired because in some situations where a facing, such as gypsum board, ceramic tile, stone or a stone veneer, is to be integrated into the structure. In such cases, it will be necessary to install the facing around the article, which can render the task of installing the facing more difficult, as well as increase a risk of damage to the article during the installation of the facing.

Accordingly, there remains a need in the art for an improved mounting system for securing an article to a structure.

SUMMARY

This section provides a general summary of the disclosure, and is not a comprehensive disclosure of its full scope or all of its features.

In one form, the present disclosure provides a mounting system for securing an article to a wall. The mounting system includes a mount member that is configured to be recessed into the wall. The mount member defines a first mount, which is configured to be abutted against a structural member of the wall, a second mount, which is parallel to the first mount, and a pair of first legs that are coupled to at least one of the first and second mounts and which space the first and second mounts apart from one another. A plurality of mounting holes are formed through the first mount and a plurality of clearance holes are formed through the second mount. Each of the clearance holes is disposed in-line with an associated one of the mounting holes. A slot is formed through the second mount. The slot is disposed between the first legs and extends through a side of the second mount.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
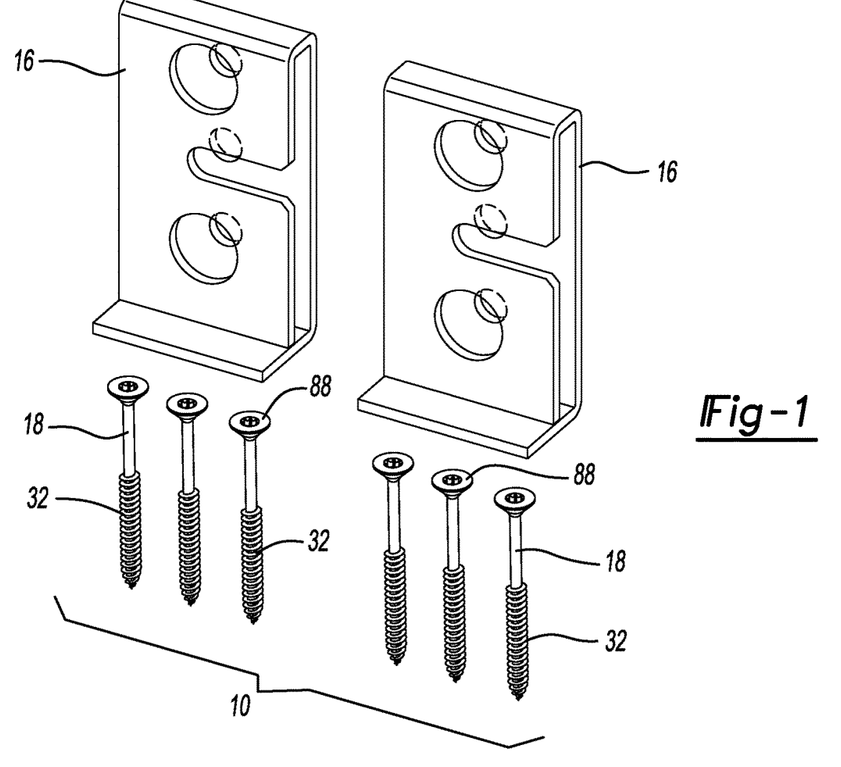
FIG. 1 is an perspective view of a mounting system constructed in accordance with the teachings of the present disclosure.
Figure 5:
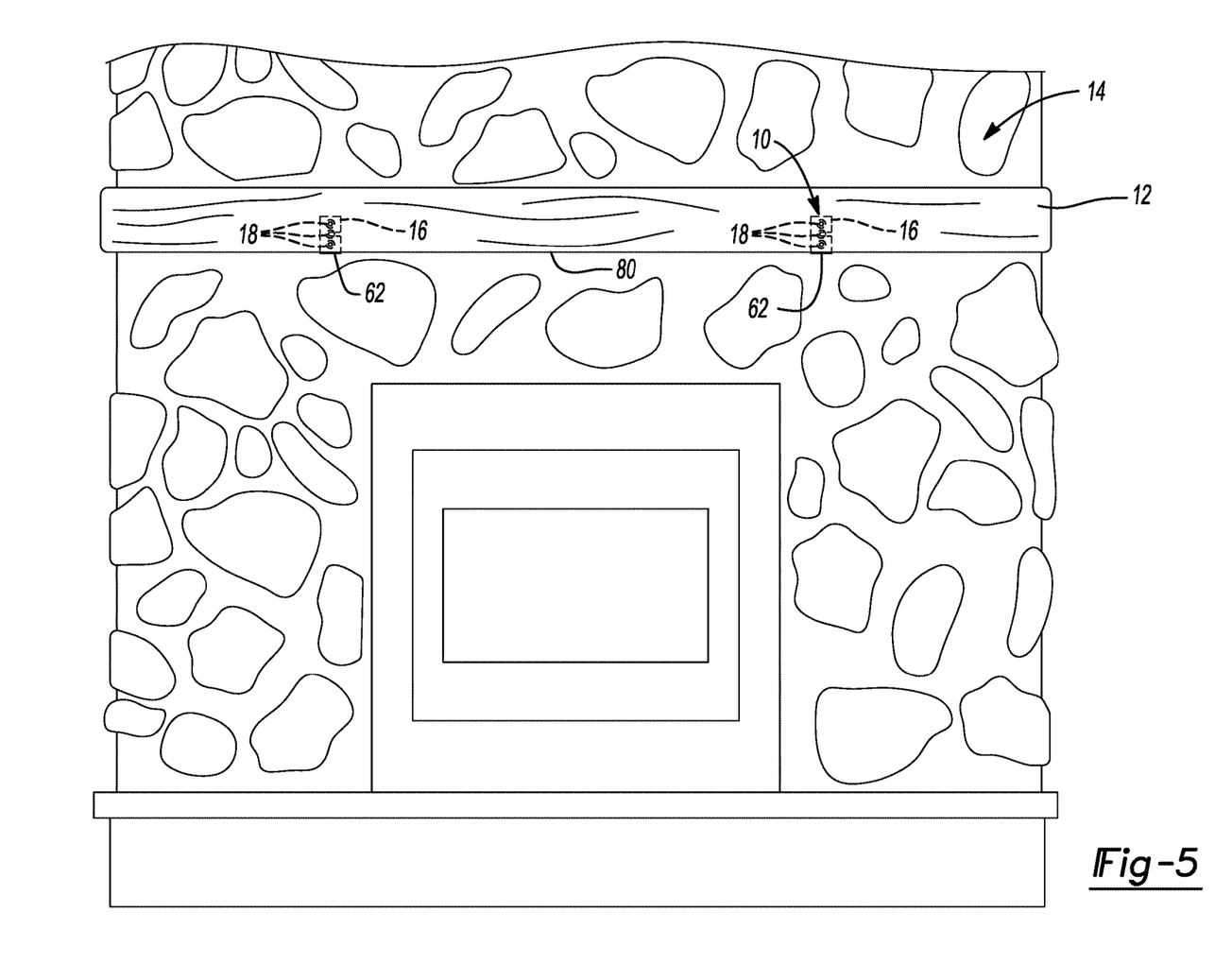
FIG. 5 is a front elevation view of an assembly that employs the mounting system of FIG. 1 to secure an article (e.g., a fireplace mantel) to a structure (e.g., a wall)

With reference to FIGS. 1 and 5, an exemplary mounting system constructed in accordance with the teachings of the present disclosure is generally indicated by reference numeral 10. The mounting system 10 is configured for use in mounting an article 12 to a structure (e.g., a wall 14) and comprises one or more mount members 16 and can optionally include a plurality of fasteners 18. As will be discussed in more detail below, two of the fasteners 18 are to be employed to secure one of the mount members 16 to the structure, while another of the fasteners 18 is to be employed to secure one of the mount members 16 to the article.

Figure 2:
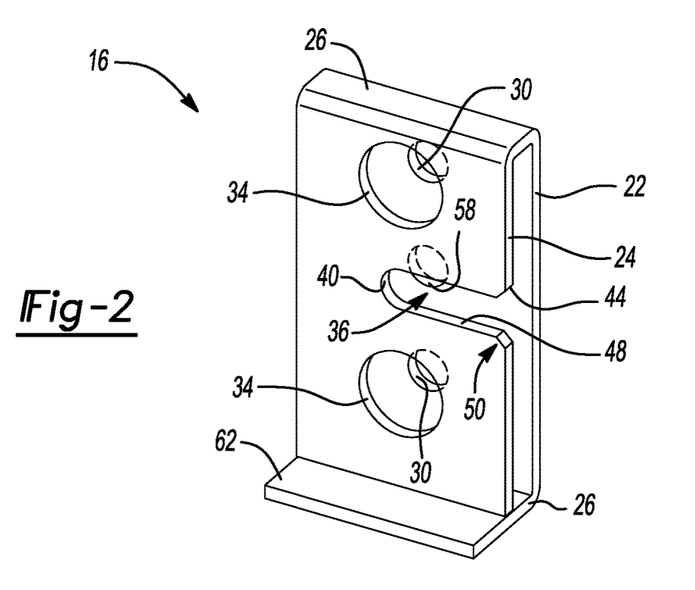
FIG. 2 is a perspective view of a portion of the mounting system of FIG. 1, illustrating a mount member in more detail.
Figure 3:
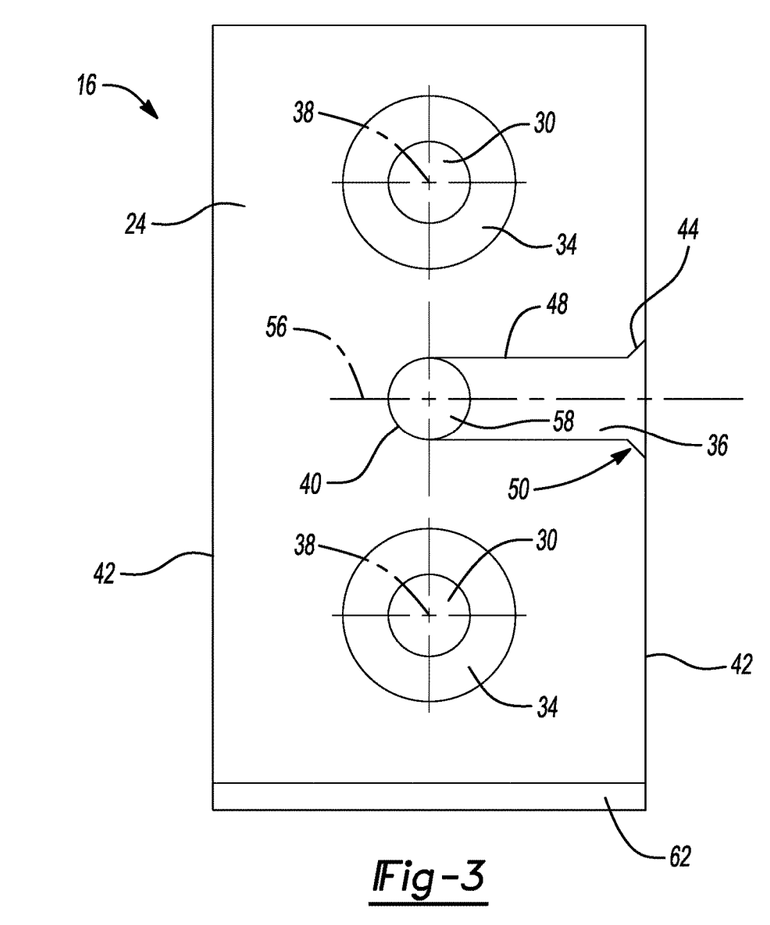
FIG. 3 is a front elevation view of the mount member.
Figure 4:
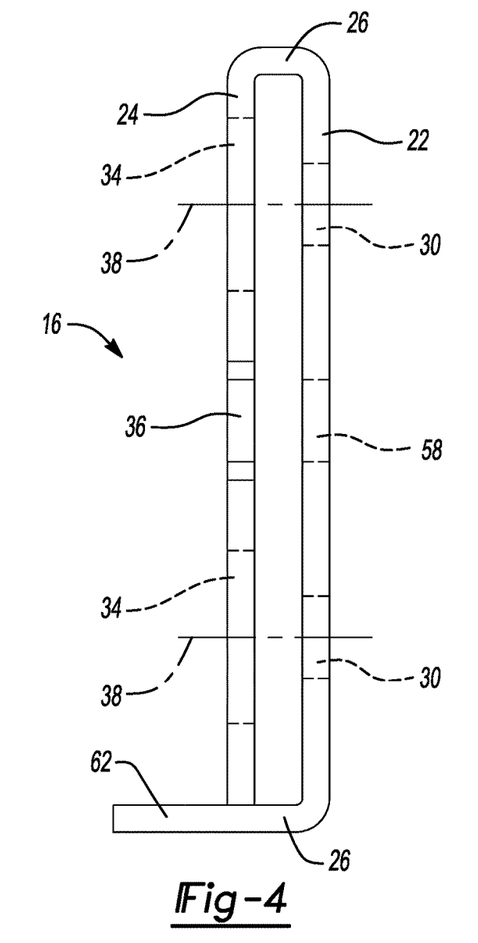
FIG. 4 is a right elevation view of the mount member.

With reference to FIGS. 2 through 4, each of the mount members 16 can include a first mount 22, a second mount 24 and a pair of first legs 26 that are coupled to at least one of the first and second mounts 22 and 24 and which space the first and second mounts 22 and 24 apart from one another. The first mount 22 is configured to be mounted to a suitable structure, such as a wall, while the second mount 24 is configured to be abutted to a side of the article that faces the structure when the article is mounted to the structure. The mount member 16 can be formed of a suitable metal material, such as aluminum, magnesium or steel, or a suitable plastic material. In the example shown, the mount member 16 is formed of a strip of steel such that the first and second mounts 22 and 24 and the first legs 26 are unitarily and integrally formed with one another and one of the first legs 26 is welded to the second mount 24 so that each of the first legs 26 is fixedly coupled to an end of the first mount 22 and an end of the second mount 24.

The first mount 22 can define a plurality of mounting holes 30 that are sized to receive a threaded segment 32 (FIG. 1) of an associated one of the threaded fasteners 18 (FIG. 1) therethrough. The second mount 24 can be disposed parallel to the first mount 22 and can define a plurality of clearance holes 34 and a slot 36. In the example provided, each of the clearance holes 34 has a circular shape that is larger in size than that of the mounting holes 30 and is disposed concentrically about a common axis 38 (FIG. 4) with one of the mounting holes 30 (i.e., each of the clearance holes 34 is disposed in-line with an associated one of the mounting holes 30). It will be appreciated, however, that the clearance holes 34 can be shaped differently and need not be centrally disposed about an axis of an associated one of the mounting holes 30. The clearance holes 34 are sized to receive an associated one of the threaded fasteners 18 (FIG. 1) therethrough so that the threaded segment 32 (FIG. 1) of the associated one of the threaded fasteners 18 (FIG. 1) may be received into the associated one of the mounting holes 30. The slot 36 is disposed between the first legs 26 and is formed through the second mount 24. The slot 36 extends between an inboard end 40, which is located between the opposite sides 42 of the second mount 24, an outboard end 44, and a central portion 48 that extends between the inboard and outboard ends 40 and 44. The slot 36 is sized in width to receive the threaded segment 32 (FIG. 1) of an associated one of the threaded fasteners 18 therethrough. In the example provided, the slot 36 also defines an alignment portion 50 that is disposed adjacent the outboard end 44. The alignment portion 50 is sized relatively larger in width at the outboard end 44 than the width of the central portion 48 and is configured to help guide the fastener 18 (FIG. 1) such that the threaded segment 32 (FIG. 1) is received into the central portion 48 of the slot 36 when the article is being mounted to the structure. As shown, the alignment portion 50 is formed by chamfers on the outboard end 44 of the slot 36. It will be appreciated, however, that the alignment portion 50 could be formed differently and that it need not be shaped symmetrically about a longitudinal centerline 56 (FIG. 3) of the slot 36. Optionally, an alignment aperture 58 can be formed through the first mount 22 in-line with the inboard end 40 of the slot 36. Also optionally, the mount member 16 can include a lip member 62 that can extend perpendicular to the second mount 24 in a direction away from the first mount 22. The lip member 62 can be employed to abut a side of the article that is perpendicular to the side of the article that is to abut the structure. In the example provided, the lip member 62 is unitarily and integrally formed with one of the first legs 26.

Figure 6:
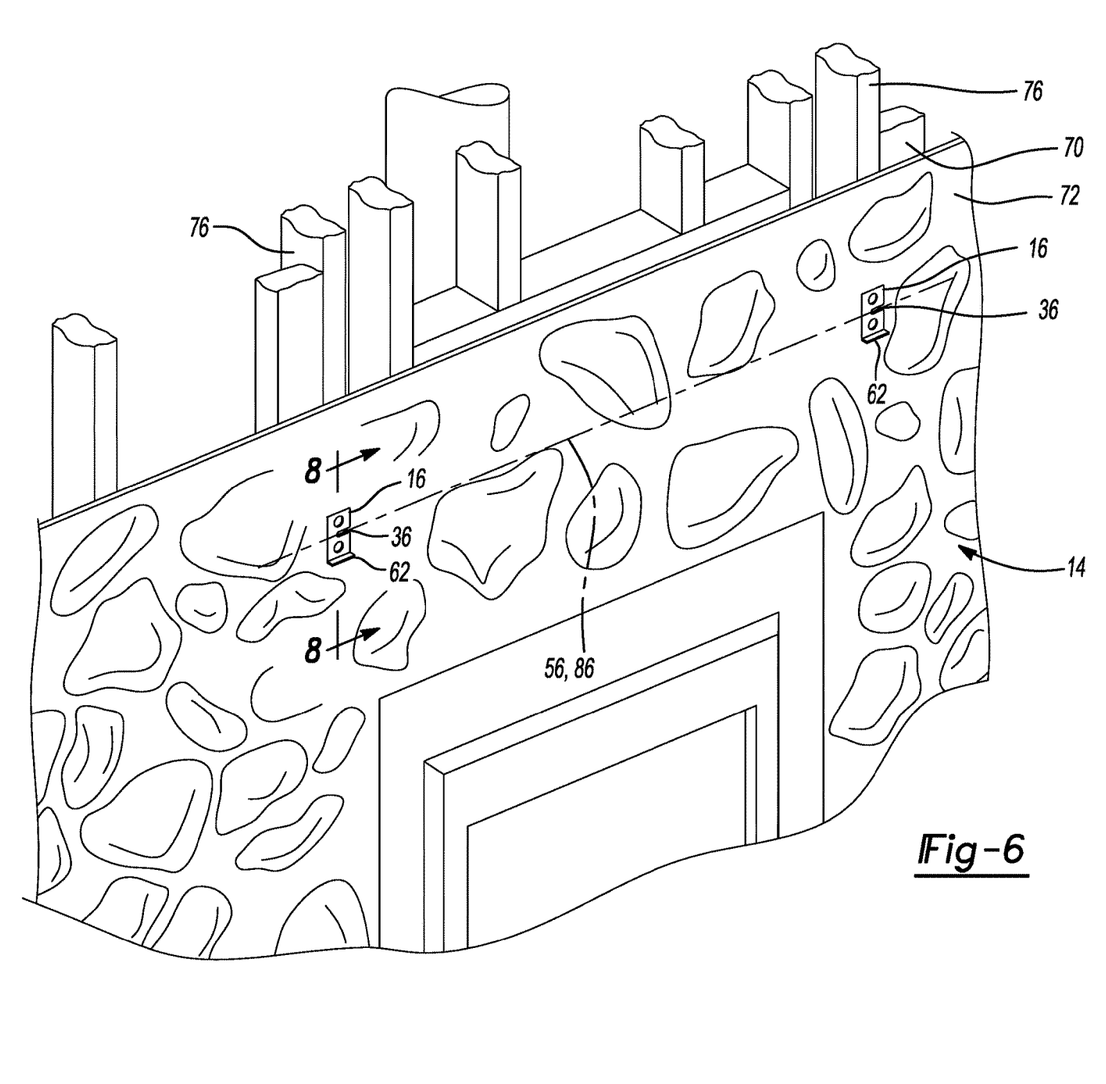
FIG. 6 is a perspective, partly fragmented view of the assembly of FIG. 5 that illustrates the coupling of the mounting system to the structure.
Figure 7:
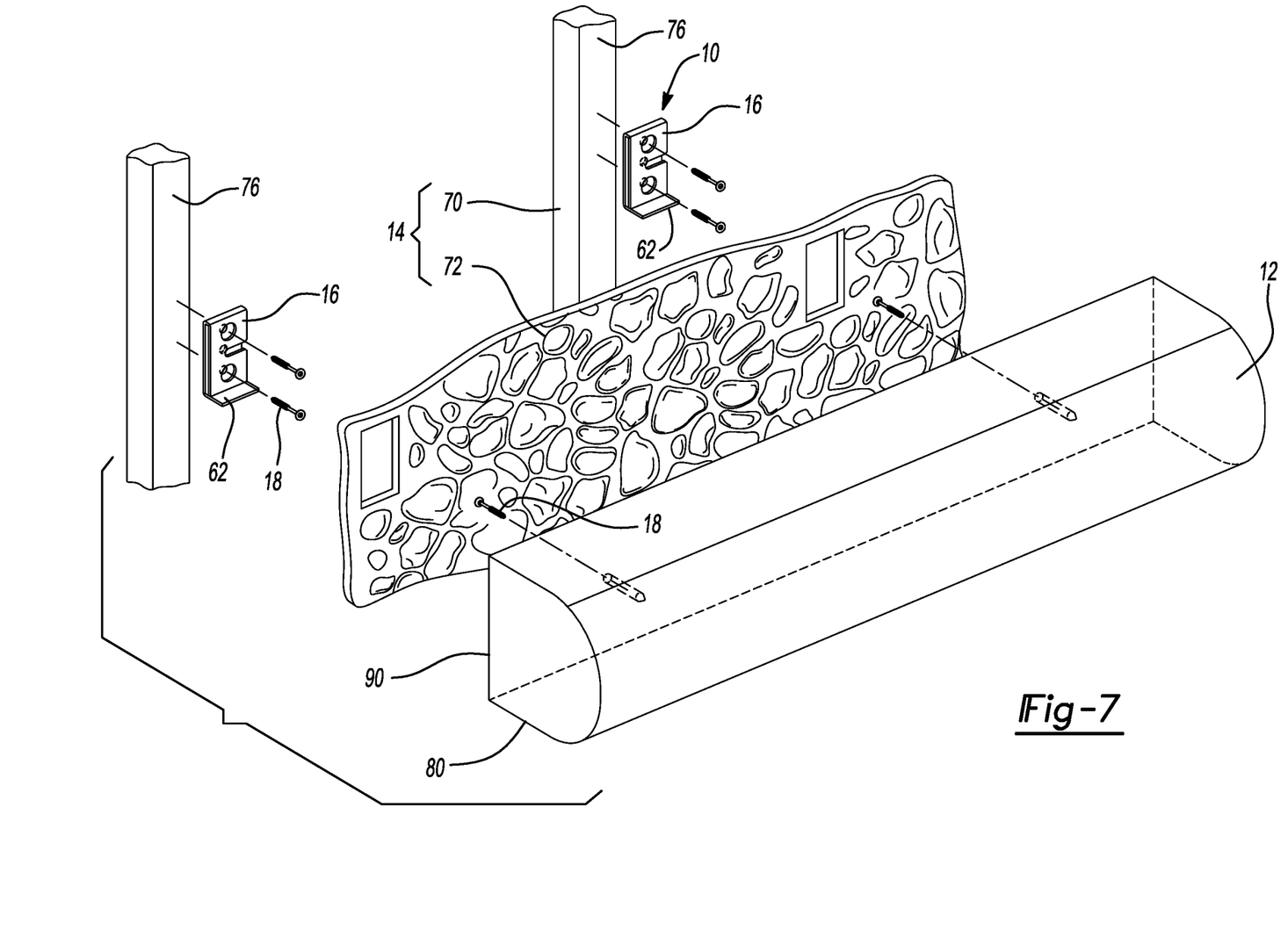
FIG. 7 is an exploded perspective view the assembly of FIG. 5.
Figure 8:
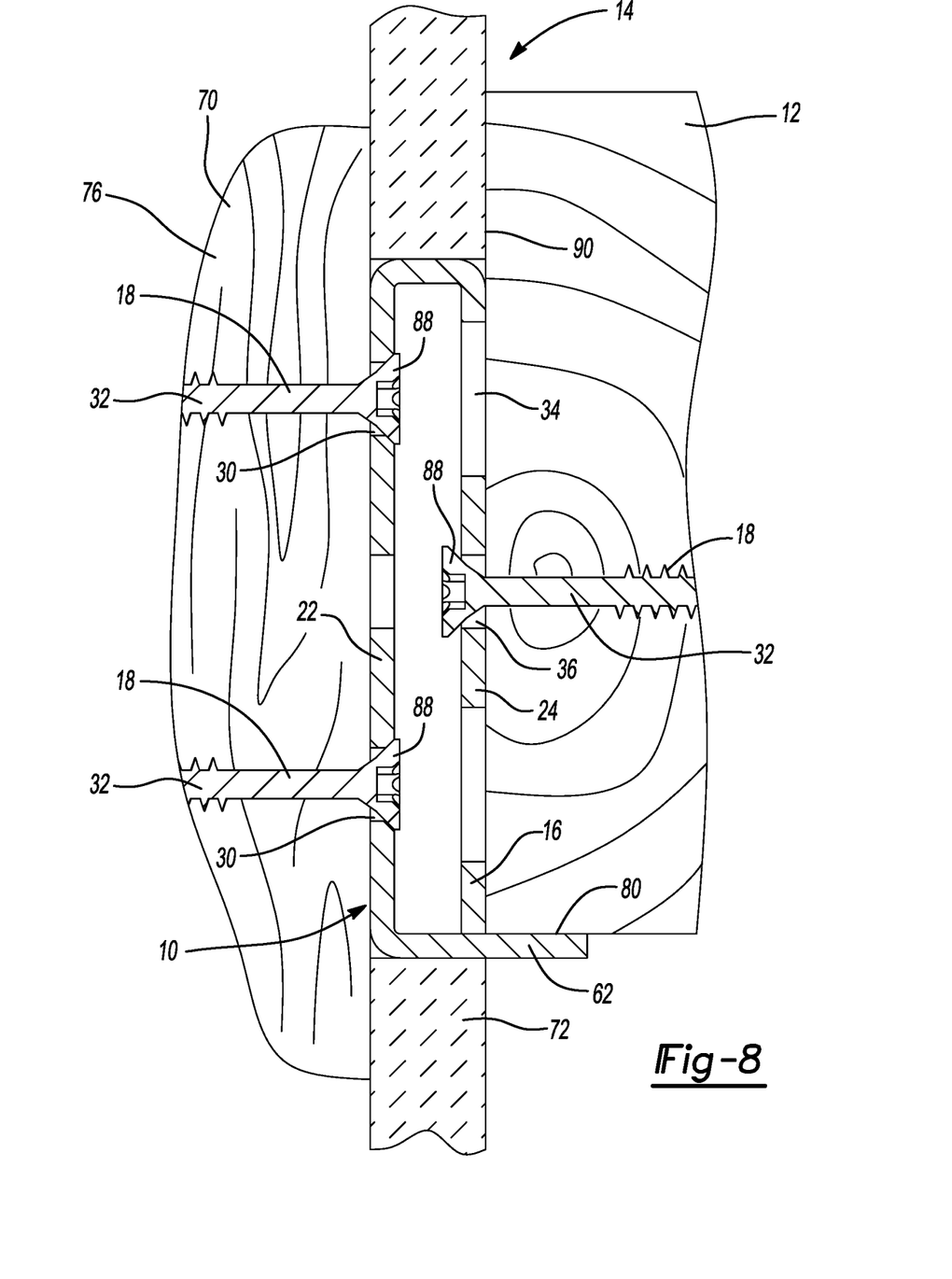
FIG. 8 is a section view taken along the line 8-8 of FIG. 6.

With reference to FIGS. 5-8, the mounting system 10 is illustrated as having a pair of mount members 16 that secure the article 12 to the wall 14. In the example provided, the article 12 is depicted as being a fireplace mantel and the wall 14 includes framing 70 and a facing 72 (FIG. 6). The framing 70 is depicted as having a plurality of studs 76, but it will be appreciated that the wall 14 could be formed differently. In this regard, the wall 14 could be formed of reinforced concrete or could be an assembly with framing formed out of sheet metal. Each of the mount members 16 is attached to a corresponding one of the studs 76 in the example provided such that the mount members 16 are spaced apart by a predetermined distance. The facing 72 can comprise any type of facing material, such as paneling or gypsum board, that can be fixedly coupled to the framing 70 to cover and close the framing 70. In the example provided, the facing 72 is an assembly that comprises a cement board, which can be fastened to the framing 70 via screws or nails (not shown) and a stone veneer that can be secured to the cement board with an appropriate material, such as a thinset material or an adhesive.

If the mount members 16 include an alignment aperture 58, the mount members 16 may be positioned at desired locations on the article 12 such that the mount members 16 are spaced apart from one another by the predetermined distance. If the mount members 16 include lip members 62, the lip members 62 can contact a bottom surface 80 of the article 12 when the mount members 16 are positioned at the desired locations. Thereafter, a drill, a nail, screw, pencil, etc. may be inserted through each alignment aperture 58 and through the inboard end 40 of the slot 36 to pre-drill or mark the article 12 at a location where one of the fasteners 18 is to be installed.

The mount members 16 can next be coupled to the wall 14 such that the outboard ends of the slots 36 are disposed on the same side (i.e., the slots 36 face in the same direction), with the longitudinal centerlines 56 of the slots 36 disposed along a common axis 86 and the mount members 16 spaced apart from one another by the predetermined distance. The first mounts 22 of the mount members 16 can be secured to the studs 76. More specifically, the threaded segments 32 of a pair of the threaded fasteners 18 can be installed through the clearance holes 34 and the mounting holes 30 in a corresponding one of the mount members 16 and threaded into a corresponding one of the studs 76. The heads 88 of the pair of threaded fasteners 18 can pass through the clearance holes 34 as the fasteners 18 are being installed to the studs 76. The heads 88 can ultimately be tightened against the first mounts 22 to fixedly secure the first mounts 22 to the studs 76.

In some situations, the facing 72 can then be installed to the framing 70 and around the mount members 16, while in other situations a portion of the facing 72 can be removed prior to the installation of the mount members 16 to the framing 70. The mount members 16 can be recessed into the wall 14 such that the second mount 24 of each mount member 16 is disposed flush or below the side of the facing 72 that is opposite the framing 70. It will be appreciated that the second mount 24 is spaced apart from the first mount 22 by a distance that permits the second mount 24 to be flush or slightly below a plane defined by the surface of the facing 72 that is opposite the framing 70. Accordingly, it will be appreciated that the first legs 26 can be sized to accommodate the thickness of the facing 72. If the mount members 16 include a lip member 62, the lip member 62 may protrude from the wall 14 so as to form the ledge on which the article 12 can rest when the article 12 is to be mounted to the wall 14.

The remaining fasteners 18 can be installed to the article 12 at the pre-drilled or pre-marked locations. If the locations of the remaining fasteners 18 have not been pre-drilled or pre-marked on the article 12, the remaining fasteners 18 may be installed to the article 12 such that the remaining fasteners 18 are spaced apart by the predetermined distance and are located on the article 12 to position the article 12 in a desired location relative to the mount members 16, such as a location that positions a centerline of the article 12 equally between the mount members 16. In the example provided, the remaining fasteners 18 are not fully threaded into the article 12. Rather, the heads 88 of the remaining fasteners 18 extend from a rear surface 90 of the article 12 by a distance that permits the threaded segments 32 of the remaining threaded fasteners 18 to be received into the outboard ends 44 (FIG. 3) of the slots 36 and slid along slots 36 until they are positioned at the inboard end 40 (FIG. 3) of the slots 36. If the mount members 16 include the lip members 62, the lip members 62 can help to support and guide the article 12 as the threaded segments 32 of the remaining fasteners 18 are introduced to the slots 36 and moved into the inboard ends 40 (FIG. 3) of the slots 36. If the slots 36 is/are formed with an alignment portion 50 (FIG. 3), each alignment portion 50 (FIG. 3) can help to guide to the threaded segment 32 of an associated one of the threaded fasteners 18 into the central segment 48 (FIG. 3) of the slot 36.

Figure 9:
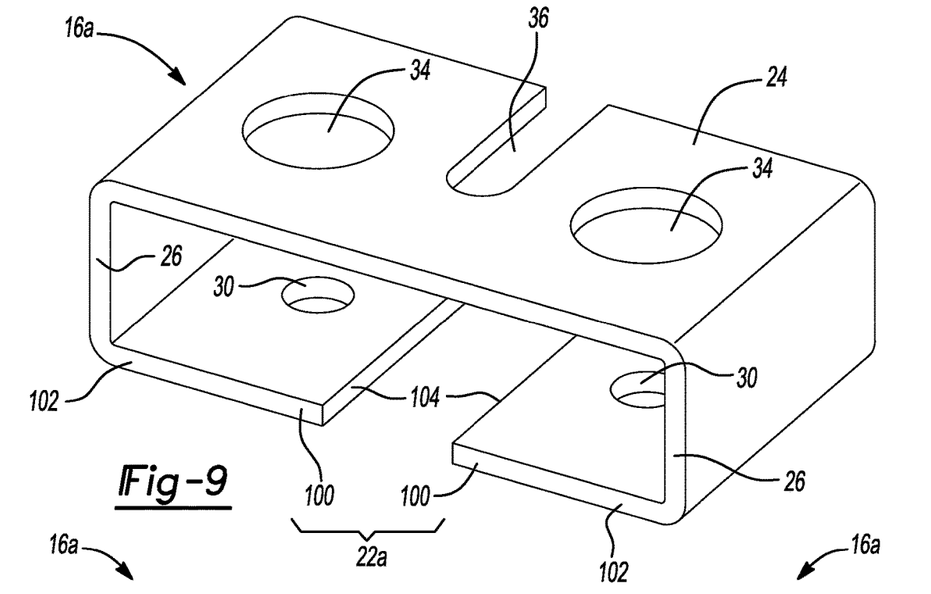
FIG. 9 is a perspective view of a second mount member constructed in accordance with the teachings of the present disclosure.
Figure 10:
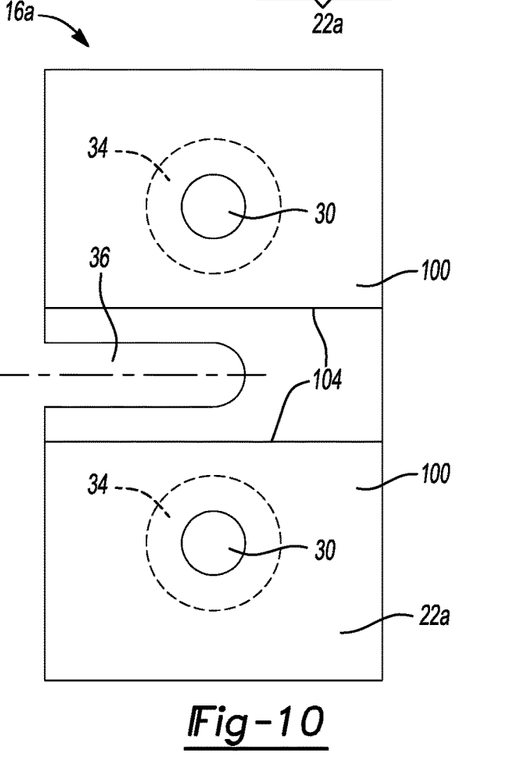
FIG. 10 is a rear plan view of the mount member of FIG. 9.
Figure 11:
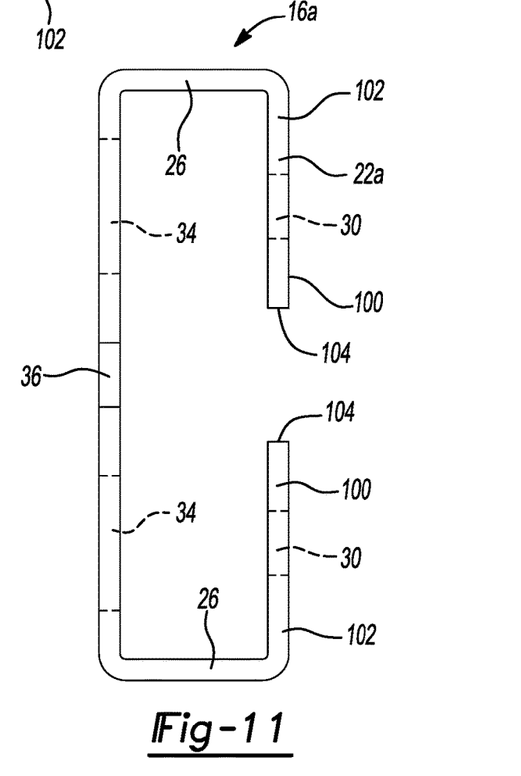
FIG. 11 is a right elevation view of the mount member of 9.

With reference to FIGS. 9-11, a second mount member 16a constructed in accordance with the teachings of the present disclosure is illustrated. In this example, the first mount 22a is constructed in two distinct segments 100, with each of the segments 100 having a first end 102, which is fixedly coupled to one of the first legs 26, and a second end 104 that is disposed closer to the other segment 100 than the first end 102.

Figure 12:
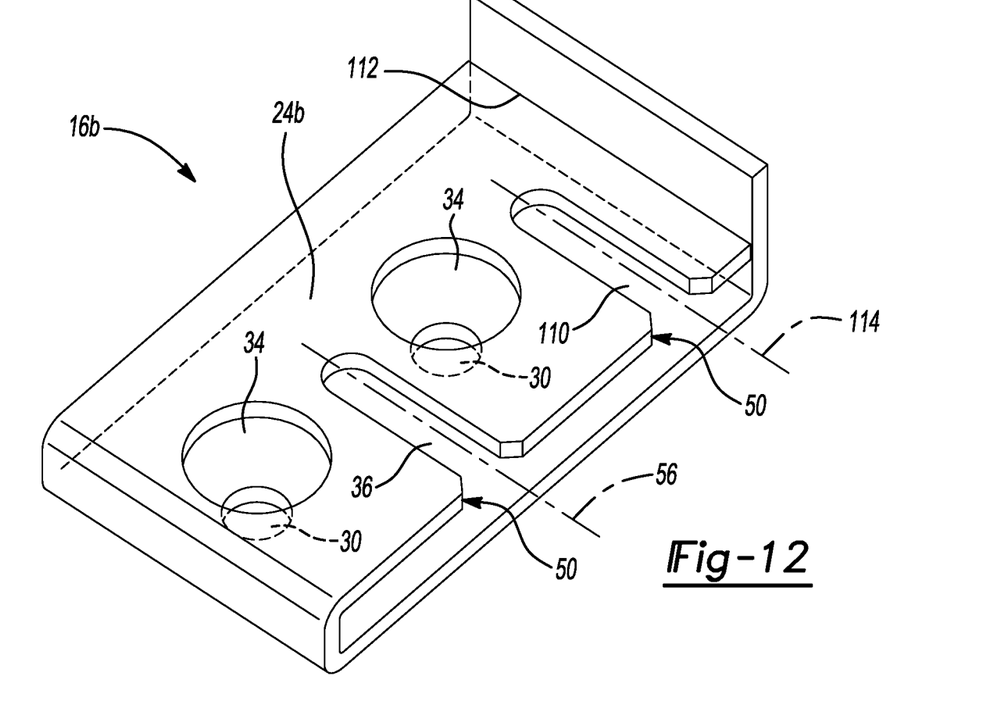
FIG. 12 is a perspective view of a third mount member constructed in accordance with the teachings of the present disclosure.

With reference to FIG. 12, a third mount member 16b constructed in accordance with the teachings of the present disclosure is illustrated. The mount member 16b can be generally similar to the mount member 16 (FIG. 2), except that it includes a second slot 110. The second slot 110 can be generally similar to the slot 36, and can be positioned on the second mount 24b in a location that is disposed between one of the clearance holes 34 and an end 112 of the second mount 24b. The second slot 110 can have a longitudinal centerline 114 that is parallel to the longitudinal centerline 56 of the slot 36.

Figure 13:
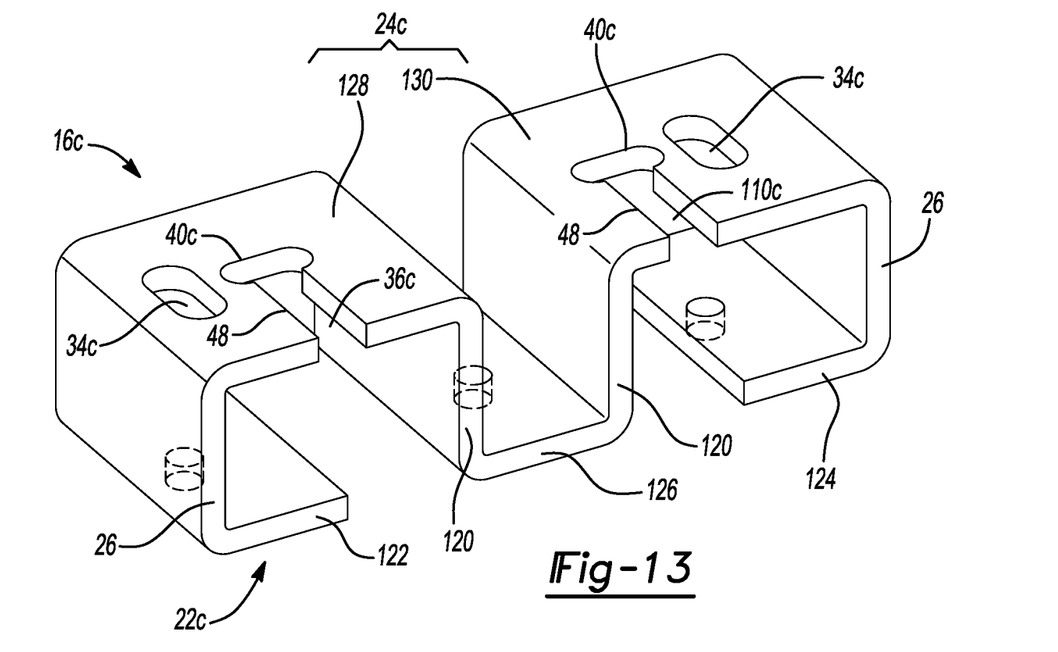
FIG. 13 is a perspective view of a fourth mount member constructed in accordance with the teachings of the present disclosure.

In FIG. 13, a fourth mount member 16c constructed in accordance with the teachings of the present disclosure is illustrated. In this example, the mount member 16c additionally includes a pair of second legs 120, and the mount member 16c is constructed such that the first mount 22c is formed in three discrete segments (i.e., a first end segment 122, a second end segment 124 and a central segment 126 that is located between the first and second end segments 122 and 124), and the second mount 24c is formed in two discrete segments (i.e., a first segment 128 and a second segment 130). Each of the first and second end segments 122 and 124 of the first mount 22c can have a first end, which is fixedly coupled to an associated one of the first legs 26, and a second, opposite end. Each of the segments 128 and 130 of the second mount 24c can have a first end, which is fixedly coupled to an associated one of the first legs 26, and a second, opposite end. Each of the second legs 120 can be fixedly coupled to the second end of an associated one of the segments 128 and 130 of the second mount 24c and to a respective end of the central segment 126 of the first mount 22c. The slot 36c and the second slot 110c are each formed in a respective one of the segments 128 and 130 of the second mount 24c. In the example illustrated, the clearance holes 34c in the second mount 24c are formed as oval slots, and the inboard ends 40c of the slot 36c and the second slot 110c are formed wider than the central portion 48. Configuration of the inboard ends 40c in this manner permits the fasteners 18 (FIG. 5) in the article 12 (FIG. 5) to drop into the inboard ends 40c, which would tend to resist movement of the article relative to the mount members 16c in a direction that would withdraw the fasteners 18 (FIG. 5) from the slot 36c and the second slot 110c.

Figure 14:
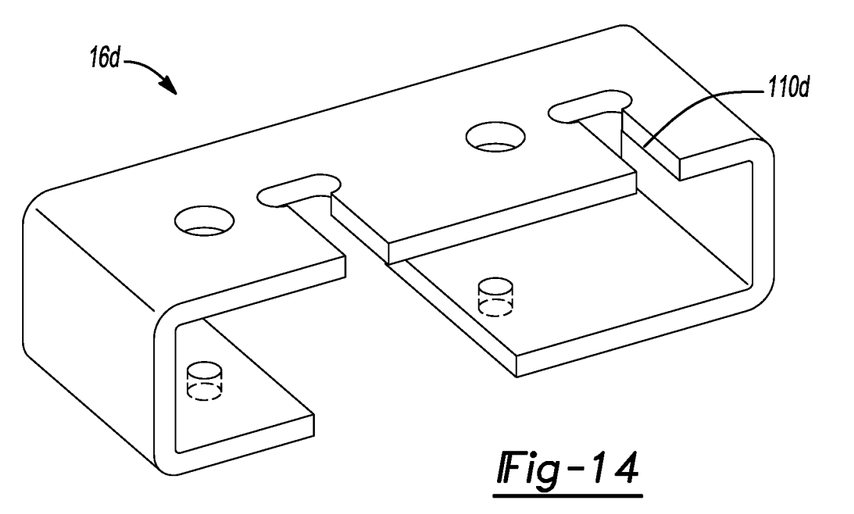
FIG. 14 is a perspective view of a fifth mount member constructed in accordance with the teachings of the present disclosure.

With reference to FIG. 14, a fifth mount member 16d constructed in accordance with the teachings of the present disclosure is illustrated. The mount member 16d is generally similar to that of FIG. 9 but is elongated somewhat to include a second 110d.

Figure 15:
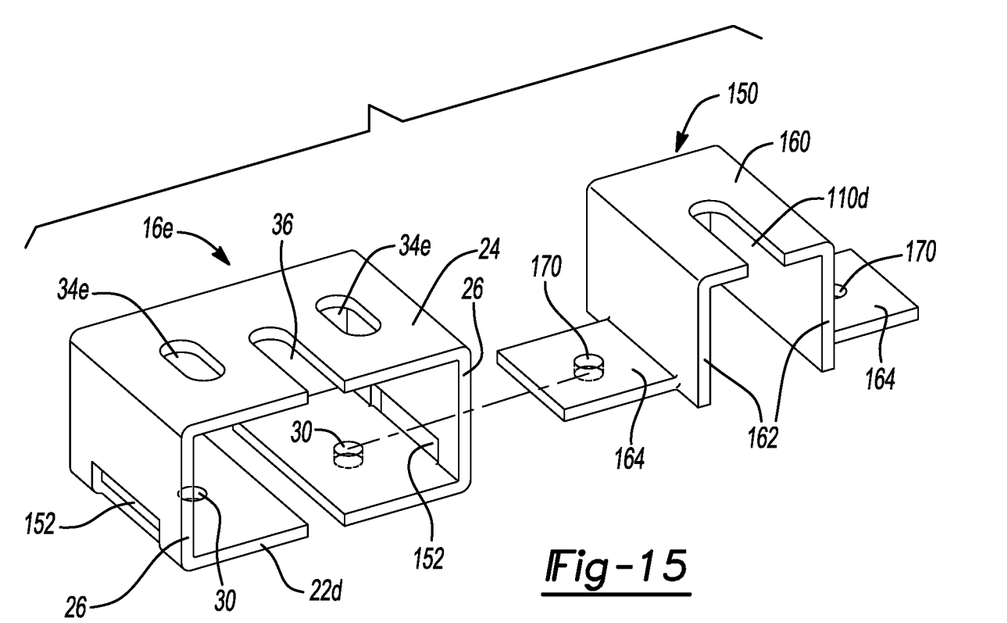
FIG. 15 is a perspective view of another mounting system constructed in accordance with the teachings of the present disclosure.

With reference to FIG. 15, a portion of another mounting system constructed in accordance with the teachings of the present disclosure is shown to include a mount member 16e and an auxiliary mount 150. The mount member 16e can be generally similar to the mount member 16a of FIG. 9, except that the clearance holes 34e are depicted as being oval slotted apertures and a slotted aperture 152 is formed through each of the first legs 26. The auxiliary mount 150 is formed as a separate and discrete component and includes a third mount 160, a pair of auxiliary legs 162, which are fixedly coupled to opposite ends of the third mount 160, and a pair of arms 164. The third mount 160 defines a second slot 110d that is formed through the third mount 160 and disposed between the auxiliary legs 162. The second slot 110d intersects a side of the third mount 160 and can be generally similar to the slot 36 in the second mount 24. Each of the auxiliary legs 162 can extend from an associated end of the third mount 160 and can be fixedly coupled to a corresponding one of the arms 164. Each of the arms 164 can extend from its respective auxiliary leg 162 in a direction away from the third mount 160. An auxiliary mounting hole 170 can be formed through each of the arms 164. Each of the slotted apertures 152 in the first legs 26 is sized to receive a corresponding one of the arms 164 therethrough such that the auxiliary mounting hole 170 can be aligned to a corresponding one of the mounting holes 30 in the first mount 22d. Accordingly, it will be appreciated that the auxiliary mount 150 can be assembled to the mount member 16e when the mount member 16e and the auxiliary mount 150 are attached to the structure to selectively provide an additional slot (i.e., the second slot 110d) for use in securing an article to a structure. It will also be appreciated that the auxiliary mount 150 can be disposed between two of the mount members 16e to provide an additional slot 36 for use in securing the article to the structure in situations where additional strength of the connection between the article and the structure is desired.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mounting system for securing an article to a wall, the mounting system comprising a mount member that is adapted to be recessed into the wall, the mount member defining a first mount, which is adapted to be abutted against a structural member of the wall, a second mount, which is parallel to the first mount, and a pair of first legs that are coupled to at least one of the first and second mounts and which space the first and second mounts apart from one another, wherein a plurality of mounting holes are formed through the first mount, wherein a plurality of clearance holes are formed through the second mount, each of the clearance holes being disposed in-line with an associated one of the mounting holes, and wherein a slot is formed through the second mount, the slot being disposed between the first legs and extending through a lateral edge of the second mount that is located between the first legs;

wherein the first mount, the second mount and the first legs are a unitarily and integrally formed structure.

2. The mounting system of claim 1, wherein an alignment aperture is formed through the first mount, the alignment aperture being disposed in-line with an inboard end of the slot.

3. The mounting system of claim 1, wherein each of the clearance holes is coaxial with the associated one of the mounting holes.

4. The mounting system of claim 3, wherein each of the clearance holes is larger in diameter than the associated one of the mounting holes.

5. The mounting system of claim 1, wherein the slot has an alignment portion, an inboard end and a central portion that is disposed between the alignment portion and the inboard end, and wherein an outboard side of the alignment portion is wider than the central portion of the slot.

6. The mounting system of claim 1, wherein the slot has an inboard end and a central portion that is disposed adjacent to the inboard end, and wherein the inboard end is wider than the central portion.

7. The mounting system of claim 6, wherein the slot includes an alignment portion on an outboard end of the slot.

8. The mounting system of claim 1, wherein a first axis is defined by centerlines of the mounting holes, and wherein a second axis is defined by a longitudinal centerline of the slot, and wherein the second axis is oriented perpendicular to the first axis.

9. The mounting system of claim 1, further comprising a lip member that extends perpendicular to the second mount in a direction away from the first mount.

10. The mounting system of claim 9, wherein the lip member is unitarily and integrally formed with one of the first legs.

11. The mounting system of claim 1, wherein the first and second mounts are fixedly coupled to the first legs.

12. The mounting system of claim 1, wherein the mount member is formed of a metal material.

13. The mounting system of claim 12, wherein the metal material comprises steel.

14. A mounting system for securing an article to a wall, the mounting system comprising:

a mount member that is adapted to be recessed into the wall, the mount member defining a first mount, which is adapted to be abutted against a structural member of the wall, a second mount, which is parallel to the first mount, and a pair of first legs that are coupled to at least one of the first and second mounts and which space the first and second mounts apart from one another, wherein a plurality of mounting holes are formed through the first mount, wherein a plurality of clearance holes are formed through the second mount, each of the clearance holes being disposed in-line with an associated one of the mounting holes, and wherein a slot is formed through the second mount, the slot being disposed between the first legs and extending through a side of the second mount; and an article attachment fastener having a body and a head, at least a portion of the body being threaded, the head being at least 1.5 times bigger in diameter than the threaded portion of the body, wherein when the article is secured to the mount member, the body is received through the slot and threaded into the article and the head is spaced apart from the second mount by a distance that permits the article attachment fastener to slide relative to the mount member.

15. The mounting system of claim 14, wherein the head is at least 2 times bigger in diameter than the threaded body.

16. The mounting system of claim 14, wherein threaded portion of the body is formed with relatively fine pitch threads.

17. The mounting system of claim 1, wherein the first mount is formed in two distinct portions and wherein each of the portions of the first mount has a first end, which is fixedly coupled to a first one of the first legs, and a second, opposite end that is closer to a second one of the first legs than is the first end.

18. The mounting system of claim 17, further comprising a discrete auxiliary mount member having a pair of auxiliary legs, a third mount spanning the pair of auxiliary legs, and a pair of arms, wherein an auxiliary slot is formed through the third mount, the auxiliary slot being disposed between the auxiliary legs and extending through a side of the third mount, each of the arms having an auxiliary mounting hole formed therethrough, wherein a slotted aperture is formed through one of the first legs in the mount member, wherein the slotted aperture is sized to receive an associated one of the arms to permit co-axial alignment of an associated one of the auxiliary mounting holes with a corresponding one of the mounting holes.

19. The mounting system of claim 1, wherein the mount member further comprises a pair of second legs, wherein the first mount is formed in three distinct sections, wherein the second mount is formed in two distinct sections, wherein the each of the second legs spans between a central one of the distinct sections of the first mount and an associated one of the distinct sections of the second mount, wherein each of the first legs spans between a corresponding one of the distinct sections of the second mount and a corresponding one of the distinct sections of the first mount other than the central one of the distinct sections of the first mount.

20. The mounting system of claim 1, further comprising an article attachment fastener having a body and a head, at least a portion of the body being threaded, the head being at least 1.5 times bigger in diameter than the threaded portion of the body, wherein when the article is secured to the mount member, the body is received through the slot and threaded into the article and the head is spaced apart from the second mount by a distance that permits the article attachment fastener to slide relative to the mount member.

* * * * *